United States Patent
Wu et al.

(10) Patent No.: US 7,876,364 B2
(45) Date of Patent: Jan. 25, 2011

(54) FALSE COLOR SUPPRESSION METHOD FOR DIGITAL IMAGE

(75) Inventors: Chung-Ta Wu, Taichung (TW); Hong-Long Chou, Taipei (TW); Yen-Ping Teng, Tainan (TW)

(73) Assignee: Altek Corporation, Hsinchu (TW)

( * ) Notice: Subject to any disclaimer, the term of this patent is extended or adjusted under 35 U.S.C. 154(b) by 391 days.

(21) Appl. No.: 12/190,744

(22) Filed: Aug. 13, 2008

(65) Prior Publication Data

US 2009/0167906 A1    Jul. 2, 2009

(30) Foreign Application Priority Data

Dec. 28, 2007  (TW) ............... 96150974 A

(51) Int. Cl.
*H04N 9/73* (2006.01)
*H04N 5/228* (2006.01)
*H04N 5/217* (2006.01)
*H04N 9/64* (2006.01)

(52) U.S. Cl. ............... 348/223.1; 348/225.1; 348/224.1; 348/222.1; 348/241; 348/242

(58) Field of Classification Search ............... 348/29, 348/242
See application file for complete search history.

(56) References Cited

U.S. PATENT DOCUMENTS

| | | | | |
|---|---|---|---|---|
| 6,075,887 A * | 6/2000 | Brett | ............ | 382/167 |
| 6,125,201 A * | 9/2000 | Zador | ............ | 382/166 |
| 6,865,291 B1 * | 3/2005 | Zador | ............ | 382/166 |
| 6,882,364 B1 * | 4/2005 | Inuiya et al. | ............ | 348/252 |
| 7,769,089 B1 * | 8/2010 | Chou | ............ | 375/240.29 |
| 2002/0104891 A1 * | 8/2002 | Otto | ............ | 235/494 |
| 2004/0257445 A1 * | 12/2004 | Ivers | ............ | 348/182 |
| 2005/0069207 A1 * | 3/2005 | Zakrzewski et al. | ............ | 382/190 |
| 2006/0056722 A1 * | 3/2006 | Moroney | ............ | 382/266 |
| 2006/0221226 A1 * | 10/2006 | Yanof et al. | ............ | 348/346 |
| 2007/0076972 A1 * | 4/2007 | Chiu | ............ | 382/261 |
| 2007/0098260 A1 * | 5/2007 | Yen et al. | ............ | 382/167 |
| 2007/0292022 A1 * | 12/2007 | Nilsson et al. | ............ | 382/167 |
| 2008/0075394 A1 * | 3/2008 | Huang et al. | ............ | 382/300 |
| 2008/0192064 A1 * | 8/2008 | Hong et al. | ............ | 345/582 |
| 2008/0259188 A1 * | 10/2008 | Kobayashi et al. | ............ | 348/247 |
| 2009/0040388 A1 * | 2/2009 | Hong | ............ | 348/665 |
| 2010/0260432 A1 * | 10/2010 | Shimizu et al. | ............ | 382/255 |

* cited by examiner

*Primary Examiner*—Lin Ye
*Assistant Examiner*—Chia-Wei A Chen
(74) *Attorney, Agent, or Firm*—Workman Nydegger

(57) ABSTRACT

A false color suppression method for a digital image is described. The method is performed in a digital camera, for suppressing the false color of the digital image shot by the digital camera. The method includes separating a luminance part and a chrominance part of a digital image; extracting the chrominance part, and calculating a first color gamut component and a second color gamut component in the chrominance part; setting a critical value according to a photosensitivity during shooting by the digital camera; performing a corresponding pixel uniformization action on the pixel according to a relation between a difference between the pixel and adjacent neighboring pixels and the critical value respectively for the first color gamut component and the second color gamut component; and combining the uniformized chrominance part and the luminance part of the digital image to a suppressed image.

6 Claims, 5 Drawing Sheets

Critical value =100

| C(0,0) | C(0,1) | C(0,2) | C(0,3) | C(0,4) |
|---|---|---|---|---|
| C(1,0) | (255,255) C(1,1) | (255,255) C(1,2) | (255,255) C(1,3) | C(1,4) |
| C(2,0) | (255,255) C(2,1) | (100,100) C(2,2) | (255,255) C(2,3) | C(2,4) |
| C(3,0) | (255,255) C(3,1) | (255,255) C(3,2) | (255,255) C(3,3) | C(3,4) |
| C(4,0) | C(4,1) | C(4,2) | C(4,3) | C(4,4) |

FALSE COLOR SUPPRESSION METHOD FOR DIGITAL IMAGE

CROSS-REFERENCE TO RELATED APPLICATIONS

This non-provisional application claims priority under 35 U.S.C. §119(a) on Patent Application No(s). 096150974 filed in Taiwan, R.O.C. on Dec. 28, 2007 the entire contents of which are hereby incorporated by reference.

BACKGROUND OF THE INVENTION

1. Field of Invention

The present invention relates to a digital image processing method, and more particularly to a false color suppression method for a digital image.

2. Related Art

For human eyes, the so-called color is actually the reflected visible light after an object absorbs the light of the most of the spectrum in the light ray. For example, after the green leaf absorbs the light of the most of the spectrum in the light ray, the human eyes receive the reflected green visible light, so as to assume the green leaf seen by people. In the nature, if the red light, the green light, and the blue light are mixed based on a certain proportion, various different colors are obtained. In fields related to computer, three primary colors of red, green, and blue are used as the color mixing reference. For example, RGB is a method of encoding the color, in which several bytes are used to express the intensity of the three primary colors of red, green, and blue, thereby expressing various different colors. The color gamut space (YUV), also called TV system color gamut (YCrCb) is also a manner of expressing the color, in which "Y" expresses the luminance of the digital image, and "U" and "V" express the chrominance, similar to the color difference (Cr and Cb) in the TV system color gamut. The principle is also applied to the digital camera, and the color light is received through photosensitive elements such as CCD, so as to generate the digital image. During using of the digital camera, usually when it is found that the light source is too dark or when the night scene is shot, the photosensitivity is improved, such that the shot digital image achieves a proper luminance. However, when the photosensitivity is improved, the noise and the false color occur. The so-called false color is the unnatural color occurring on the position in the digital image, on which originally the color shade should be same, for example, when shooting the clothes with the blue cloth, the obtained image has red wave stripes.

In order to make the image shot by the digital camera have the imaging effect of certain quality under the high photosensitivity, the false color suppression technique becomes an important topic. The recent false color suppression techniques are classified into two types. For one type, it is necessary to find out the texture and the detail of the luminance or the chrominance of the image through complicated analysis, and then obtain better suppression effect through a larger equivalent mask. If the equivalent mask is not large enough, the suppression effect is limited. For the other type, the suppression of intensity of the false color is achieved by sacrificing a part of the chrominance of the image. The human eye visual sense is sensitive to the false color on the chrominance approaching the grey scale, so in the method, mostly the color approaching the grey scale is suppressed to approach the grey scale, such that the visual effect of the false color is distinctly reduced. The two false color suppression methods have respective advantages and disadvantages. In other words, the recent false color suppression techniques cannot achieve a balance between the image process complexity and sacrificing of the chrominance.

SUMMARY OF THE INVENTION

In view of the above problem that the image processing complexity and the visual effect cannot be considered together for the false color suppression, the present invention is directed to provide a false color suppression method for a digital image, in which a chrominance uniformization action is performed on a chrominance part of each pixel in the digital image and the neighboring pixels one by one, and a false color suppression degree is adjusted according to a photosensitivity of the digital camera during shooting, so as to prevent the chrominance from sacrificing too much, thereby achieving the function of reducing the image processing complexity and effectively reducing the false color phenomenon.

In order to achieve the above objective, the false color suppression method for a digital image of the present invention includes the following steps.

Firstly, a luminance part and a chrominance part of the digital image are separated. Then, the chrominance part is extracted, and a first color gamut component and a second color gamut component in the chrominance part are calculated. Then, a critical value is set according to a photosensitivity during shooting by the digital camera. Then, a corresponding pixel uniformization action is performed on pixel according to a relation between a difference between the pixel and adjacent neighboring pixels and the critical value respectively for the first color gamut component and the second color gamut component. Finally, the uniformized chrominance part and the luminance part of the digital image are combined to a suppressed image.

In the false color suppression method for a digital image according to a preferred embodiment the present invention, the digital image is stored in a data sampling format including the luminance and the information, and the data sampling format is YUY2, YUYV, YVYU, YUV(YCbCr)411, YUV(YCbCr)420, YUV(YCbCr)422, or YUV(YCbCr)444.

In the false color suppression method for a digital image according to a preferred embodiment the present invention, the first color gamut component is expressed by a formula as follows:

$Cb=0.564*(B-Y)=-0.169*R-0.331*G+0.500*B$, in which Cb is the first color gamut component, and R, G, and B are color values of the digital image.

In the false color suppression method for a digital image according to a preferred embodiment the present invention, the second color gamut component is expressed by a formula in the following:

$Cr=0.713*(R-Y)=0.500*R-0.419*G-0.081*B$, in which Cr is the second color gamut component, and R, G, and B are color values of the digital image.

In the false color suppression method for a digital image according to a preferred embodiment the present invention, times of performing the false color suppression method for a digital image is further set according to the photosensitivity.

In the false color suppression method for a digital image according to a preferred embodiment the present invention, the pixel uniformization action includes: when a difference between the first color gamut component of a certain pixel of the digital image and the first color gamut component of the neighboring pixels is greater than or equal to the critical value, reducing the first color gamut component of the pixel through a low pass filter; and when the difference between the first color gamut component of a certain pixel of the digital image and the first color gamut component of the neighboring pixels is smaller than the critical value, directly acquiring an average value of the first color gamut component of the pixel and the neighboring pixels, and correcting the first color gamut component of the pixel.

In the false color suppression method for a digital image according to a preferred embodiment the present invention, the pixel uniformization action includes: when a difference between the second color gamut component of a certain pixel of the digital image and the second color gamut component of the neighboring pixels is greater than or equal to the critical value, reducing the second color gamut component of the pixel through the low pass filter; and when the difference between the second color gamut component of a certain pixel of the digital image and the second color gamut component of the neighboring pixels is smaller than the critical value, directly acquiring an average value of the second color gamut component of the pixel and the neighboring pixels, and correcting the second color gamut component of the pixel.

In the false color suppression method for a digital image according to a preferred embodiment the present invention, the adopted low pass filter is one selected from among the following matrix expressions:

$$LPF_1 = \begin{bmatrix} 1 & 2 & 1 \\ 2 & 4 & 2 \\ 1 & 2 & 1 \end{bmatrix};$$

$$LPF_2 = \begin{bmatrix} 0 & 1 & 0 \\ 1 & 4 & 1 \\ 0 & 1 & 0 \end{bmatrix}; \text{ and}$$

$$LPF_3 = \begin{bmatrix} 0 & 0 & 0 \\ 0 & 1 & 0 \\ 0 & 0 & 0 \end{bmatrix}.$$

To sum up, in the false color suppression method for a digital image of the present invention, the chrominance part in the digital image is extracted, and the differences between the first color gamut component and the second color gamut component of each pixel and the plurality of neighboring pixels are calculated, a critical value is set according to the photosensitivity of the camera to control the false color suppression degree, and the corresponding false color uniformization action is performed according to whether difference exceeds the critical value, thereby suppressing the false color in the digital image while achieving low operation complexity and low chrominance sacrificing degree.

BRIEF DESCRIPTION OF THE DRAWINGS

The present invention will become more fully understood from the detailed description given herein below for illustration only, and thus are not limitative of the present invention, and wherein:

FIG. 5 is the other schematic view of performing false color suppression through the core window.

DETAILED DESCRIPTION OF THE INVENTION

The objective and the provided content of the present invention are illustrated in the preferred embodiment in the following. However, the concept of the present invention can be used in other scope. The exemplified embodiment in the following is only used to illustrate the objective and the performing method of the present invention, and is not used to limit the scope.

Figure 1:
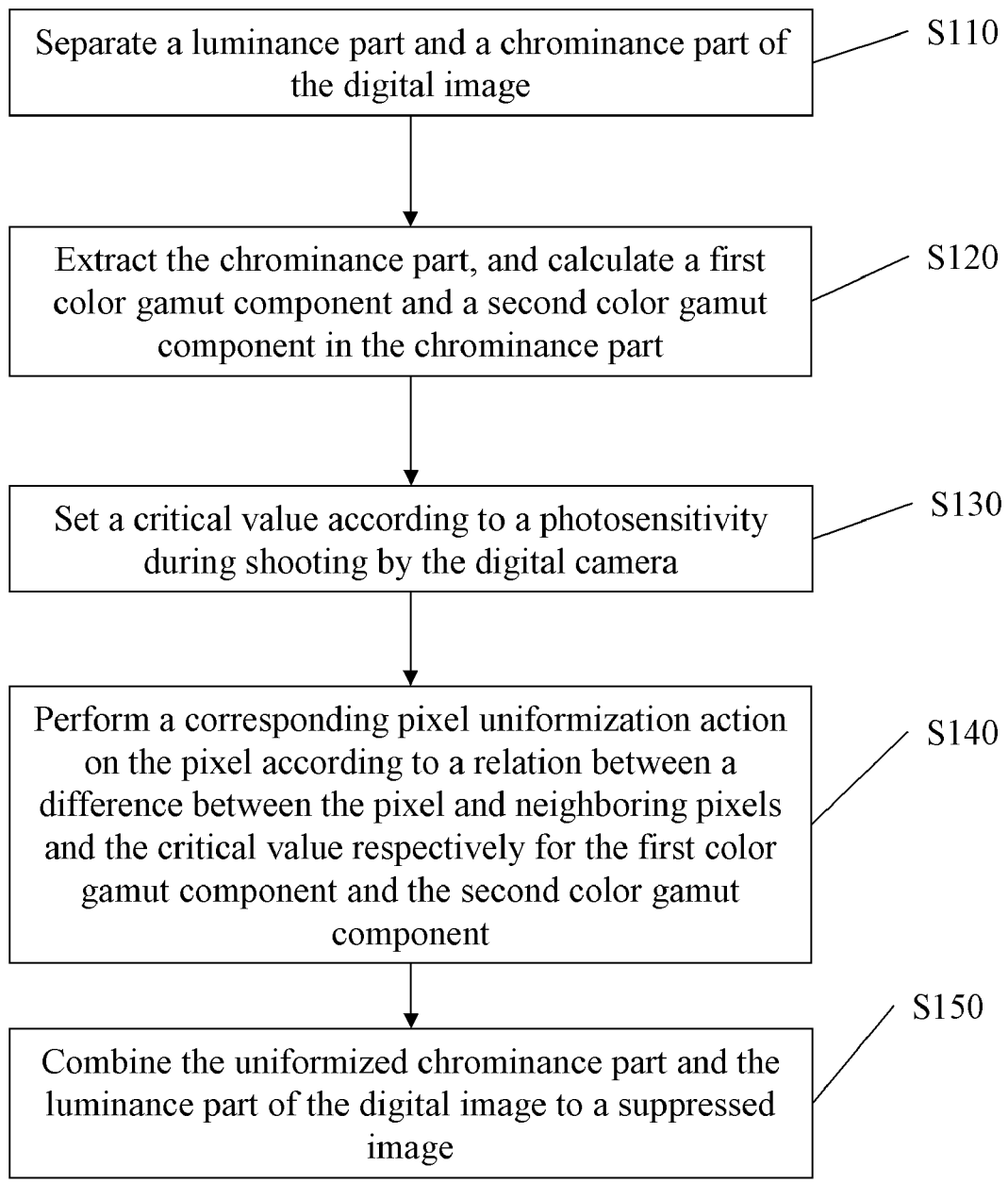
FIG. 1 is a flow chart of the false color suppression method for a digital image.

FIG. 1 is a flow chart of the false color suppression method for a digital image. Referring to FIG. 1, in this embodiment, the false color suppression method for a digital image is performed by a digital camera, for suppressing the false color in the digital image shot by the digital camera, and it includes the following steps.

Firstly, a luminance part and a chrominance part of the digital image are separated (step S110). Then, the chrominance part is extracted, and a first color gamut component and a second color gamut component in the chrominance part are calculated (step S120). Then, a critical value is set according to a photosensitivity during shooting by the digital camera (step S130). Then, a corresponding pixel uniformization action is performed on the pixel according to a relation between a difference between the pixel and adjacent neighboring pixels and the critical value respectively for the first color gamut component and the second color gamut component (step S140). Finally, the uniformized chrominance part and the luminance part of the digital image are combined to a suppressed image (step S150).

Figure 2:
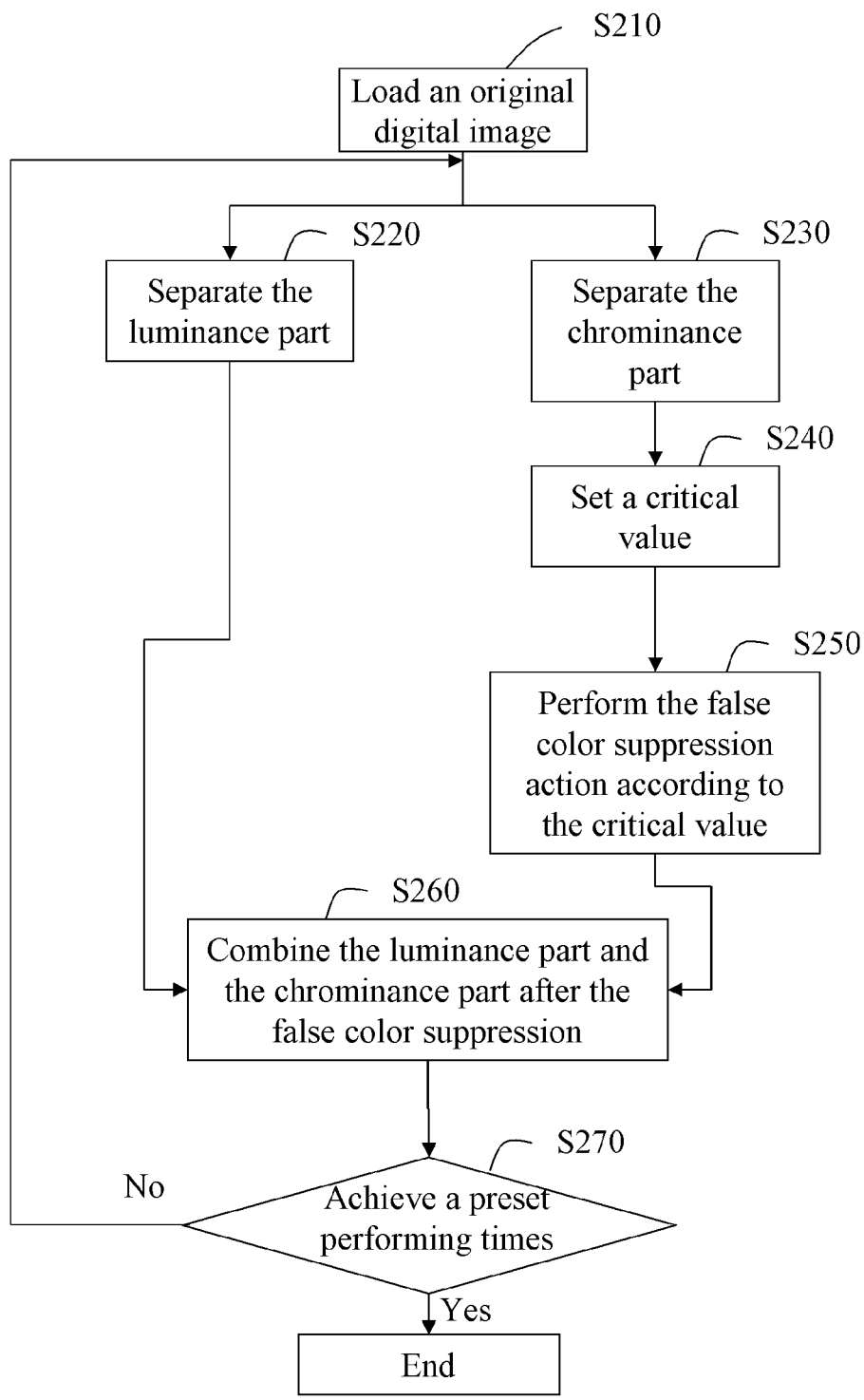
FIG. 2 is a flow chart of the false color suppression method for a digital image according to a preferred embodiment of the present invention.

FIG. 2 is a flow chart of the false color suppression method for a digital image according to a preferred embodiment of the present invention. Referring to FIG. 2, in this embodiment, after shooting the image, the digital camera loads an original digital image (step S210). An original data format of the digital image is RGB, and after loading the digital image, the digital camera converts the digital image to a data sampling format of the digital image, for example YUY2, YUYV, YVYU, YUV(YCbCr)411, YUV(YCbCr)420, YUV(YCbCr) 422, and YUV(YCbCr)444 for storing. The data sampling formats are expressed by two parts, namely, luminance and chrominance. In this embodiment, YUV data sampling format is used as an example, for example, but not limited to, luminance (Y) and color difference (Cb/Cr) are used for expressing, and any data sampling format capable of expressing the luminance and the chrominance part in the digital image is suitable for the present invention, so the scope is not limited thereby.

The so-called color difference refers to the difference between the color value and the luminance value, and can also serve as the chrominance part of the digital image. After being converted, the color data amount is reduced by half However, the quality of the image after the conversion approaches the original image.

In this embodiment, the luminance (Y) conversion can be expressed as:

$Y=0.299*R+0.587*G+0.114*B.$

In addition, the chrominance part (i.e. the color difference) includes the first color gamut component (Cb) and the second color gamut component (Cr), which are respectively expressed by the following mathematical expressions:

$Cb=0.564*(B-Y)=-0.169*R-0.331*G+0.500*B;$ and $Cr=0.713*(R-Y)=0.500*R-0.419*G-0.081*B,$ in which Cb is the first color gamut component, Cr is the second color gamut component, and R, G, and B are color values (red, green, and blue) of the digital image. From the above processing procedure, the digital camera can separate the shot digital image in to the luminance part (step S220) and the chrominance part (step S230). The false color suppression degree is related to the photosensitivity during shooting by the digital camera, so in this embodiment, a critical value is set according to the photosensitivity, for controlling the false color suppression degree (step S240). In addition, because the occurrence of the false color is regional, several pixels in the same region should have the same chrominance value representation (slight difference exists in Cb/Cr). Therefore, in this embodiment, it is inspected whether the chrominance value of the pixel approaches the chrominance value of the plurality of neighboring pixels through a core window, and the false color suppression action is performed according to the critical value (step S250), thereby suppressing the false color phenomenon by controlling the difference between the pixel and the neighboring pixels.

After the chrominance part comparison and the false color suppression action are performed on each pixel and the plurality of neighboring pixels in the digital image one by one, the luminance part of the digital image and the chrominance part after the false color suppression are combined to form a digital image after the false color suppression (step S260). However, in order to obtain the preferred digital image quality, in this embodiment, the times of performing the false color suppression is set according to the photosensitivity, when the preset performing times is achieved (step S270), the false color suppression action is finished.

Figure 3:
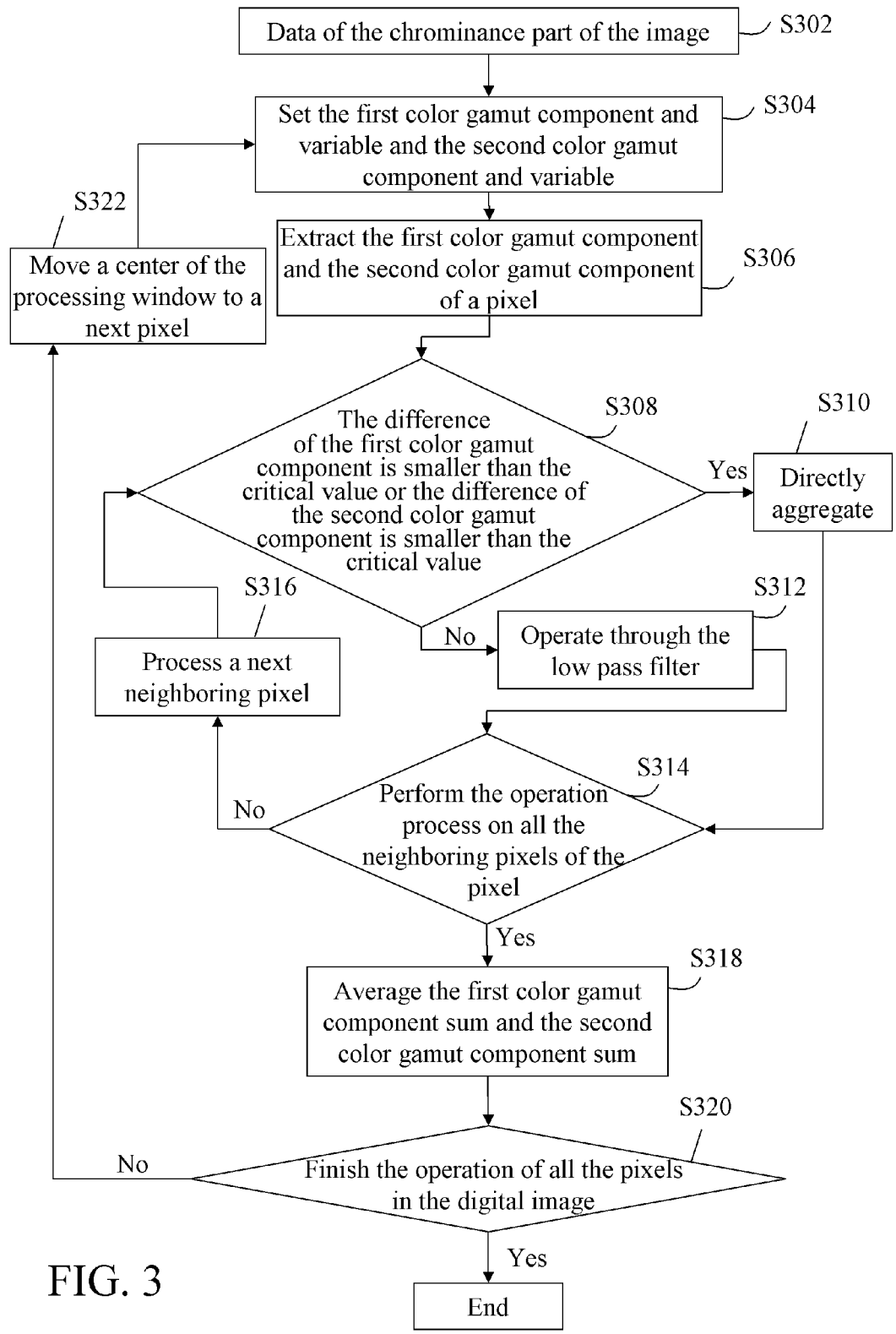
FIG. 3 is a flow chart of the false color suppression action performed according to the critical value of FIG. 2.

FIG. 3 is a flow chart of the false color suppression action performed according to the critical value of FIG. 2. Referring to FIG. 3, after image data of the chrominance part of the digital image is calculated (step S302), firstly the first color gamut component and variable Sum_Cb(X) and the second color gamut component and variable Sum_Cr(Y) are initialized, in which the variables are used for uniformizing a certain pixel in the digital image (step S304). Then, the pixels of the digital image are extracted one by one to perform the false color suppression action, and the first color gamut component and the second color gamut component converting from the RGB value data of the original pixel to the chrominance are extracted (step S306). When the difference of the first color gamut component is smaller than the critical value or the difference of the second color gamut component is smaller than the critical value (yes of step S308), it indicates that the chrominance of the pixel approaches the chrominance of the neighboring pixels. When the false color exists in the region, the false color of the image is quite distinct when viewed by human eyes. Therefore, the color gamut components of the pixel and the neighboring pixels are directly aggregated (step S310), so as to uniformize the chrominance of the image of the region. In this embodiment, the aggregation action is respectively performed on the first color gamut component and the second color gamut component in each pixel chrominance of the region, and then the chrominance parts of the pixels are averaged, so as to uniformize the chrominance effect of the region. In addition, when the difference of the first color gamut component is greater than or equal to the critical value or the difference of the second color gamut component is greater than or equal to the critical value (no of step S308), it indicates that the pixel may be at the boundary of the object of the chrominance variance. At this time, the pixel of the region can be slightly suppressed or not suppressed. In this embodiment, when the difference is greater than or equal to the critical value, the false color is suppressed through the low pass filter operation (step S312). In other words, through the low pass filter, the region, which may be the false color pixel in the region, can be reduced, thereby reducing the impression of the human eye on the false color pixel, in which the low pass filter is for example:

$$LPF_1 = \begin{bmatrix} 1 & 2 & 1 \\ 2 & 4 & 2 \\ 1 & 2 & 1 \end{bmatrix}; LPF_2 = \begin{bmatrix} 0 & 1 & 0 \\ 1 & 4 & 1 \\ 0 & 1 & 0 \end{bmatrix}; \text{or } LPF_3 = \begin{bmatrix} 0 & 0 & 0 \\ 0 & 1 & 0 \\ 0 & 0 & 0 \end{bmatrix};$$

in some embodiments, a specific low pass filter, but not limited to, can be further designed to process the pixels which may be the false color.

When the operation process is performed on all the neighboring pixels of the pixel (yes of step S314), the first color gamut component sum and the second color gamut component sum are averaged (step S318), and the average value of the first color gamut component sum and the second color gamut component sum is used as the new color gamut component value of the pixel. When the pixel is not compared with all the neighboring pixels (no of step S314), the processing action of the pixel and the neighboring pixels is continuously performed (step S316). When the operation of all the pixels in the digital image is finished, the false color suppression is finished (yes of step S320), otherwise, a center of the processing window is moved to a next pixel (step S322), and the each step of the false color suppression action is further performed.

Figure 4:
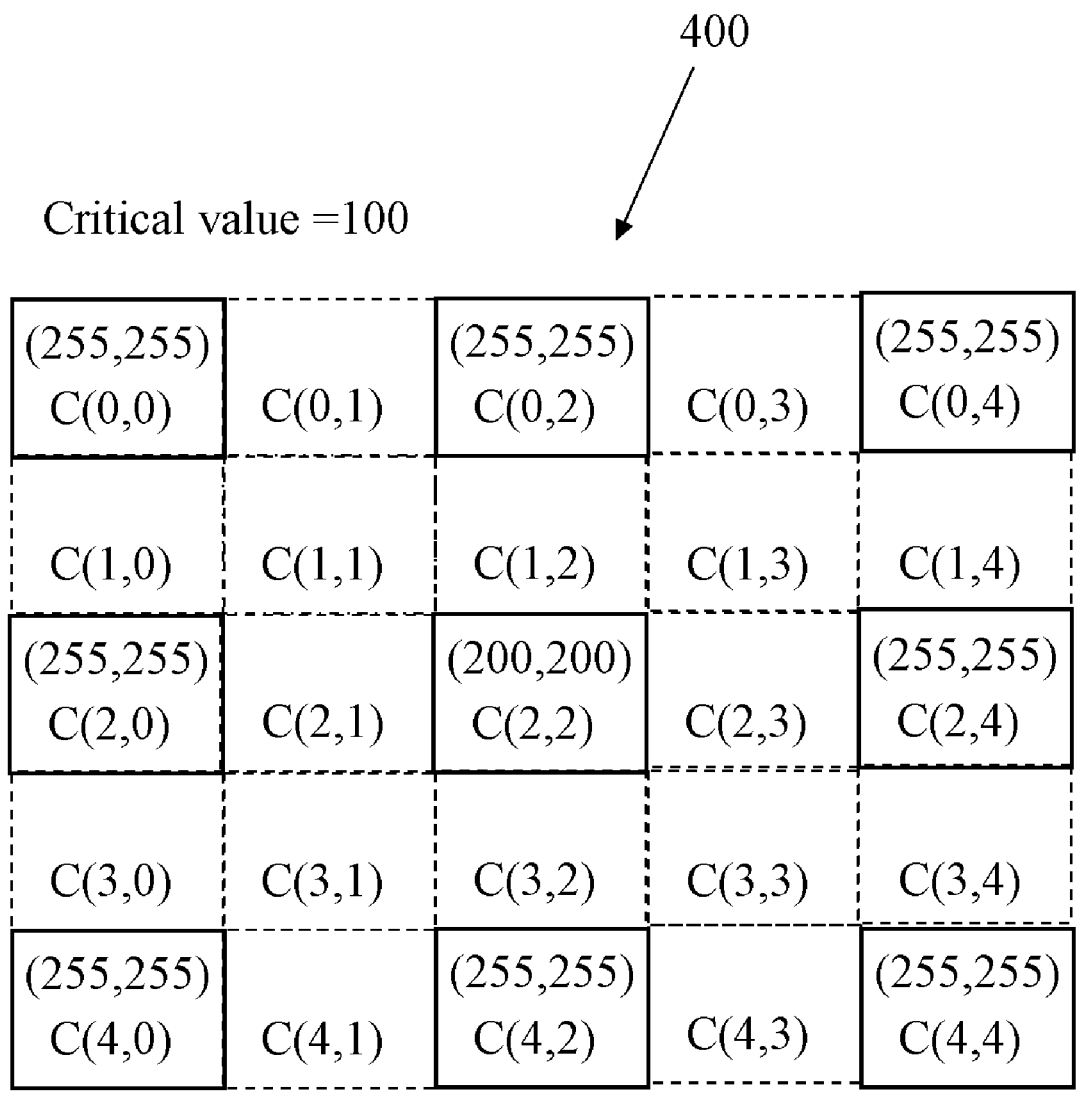
FIG. 4 is a schematic view of performing false color suppression through a core window.

FIG. 4 is a schematic view of performing the false color suppression through a core window. Referring to FIG. 4, it is assumed that recently the false color suppression is performed on a pixel C(2, 2), and a core window 400 is a window of 5*5 pixels. The critical value set according to the photosensitivity numerical value is 100, and the uniformization action is individually performed on the first color gamut component (Cb) and the second color gamut component (Cr), so as to suppress the false color. The first color gamut component of the pixel C(2,2) is 200, and the Cb/Cr values of the neighboring pixels of the neighboring eight directions are sequentially C(0,0)=(255,255), C(0,2)=(255,255), C(0,4)=(255,255), C(2,0)=(255,255), C(2,4)=(255,255), C(4,0)=(255,255), C(4,2)=(255,255), and C(4,4)=(255,255).

When the neighboring pixels are operated to acquire the differences, it is found that the differences are smaller than the critical value. At this time, when the pixel C(2,2) determines that the color gamut component of the neighboring pixels does not exceed the critical value, it indicates that the color gamut difference between the pixel C(2,2) and the neighboring pixels is smaller. At this time, the aggregated average value is directly acquired as a new color gamut component value after the pixel is uniformized. The calculation formula of the new color gamut component value of the pixel C(2,2) is, for example, C'(2,2)=(255*8/8,255*8/8)=(255,255).

FIG. 5 is the other schematic view of performing the false color suppression through the core window. Referring to FIG. 5, similarly, it is assumed that recently the false color suppression is performed on the pixel C(2, 2), and a core window 500 is a window of 5*5 pixels. The critical value set according to the photosensitivity numerical value is 100, and the uniformization action is individually performed on the first color gamut component (Cb) and the second color gamut component (Cr), so as to suppress the false color. The first color gamut component of the pixel C(2,2) is 100, and the Cb/Cr values of the neighboring pixels of the neighboring eight directions are sequentially C(1, 1)=(255,255), C(1,2)=(255, 255), C(1,3)=(255,255), C(2, 1)=(255,255), C(2,3)=(255, 255), C(3,1)=(255,255), C(3,2)=(255,255), and C(3,3)=(255, 255). After the differences between the pixel C(2, 2) and the plurality of neighboring pixels are calculated, it is found that the differences between the pixel C(2, 2) and all the neighboring pixels are all greater than or equal to the critical value. At this time, the first color gamut component and the second color gamut component of the pixel C(2,2) are suppressed through the low pass filter, so as to uniformize the chrominance of the neighboring region of the pixel.

In this embodiment, for example, $$LPF_2 = \begin{bmatrix} 0 & 1 & 0 \\ 1 & 4 & 1 \\ 0 & 1 & 0 \end{bmatrix}$$

is used as the selected low pass filter, and the color gamut components of the pixel C(2, 2) suppressed through the low pass filter are:

$Cb'(2,2)=Cb(2,2)[LPF_2]/8$, i.e., $Cb'(2,2)=255*4/8+ 100*4/8=177.5$; and $Cr'(2,2)=Cr(2,2)[LPF_2]/8$, i.e., $Cr'(2,2)=255*4/8+100*4/ 8=177.5$. After the operation, the chrominance of the pixel C(2, 2) is expressed as C(2,2)=(177.5,177.5). It should be noted that the selection of the low pass filter is not limited to the LPF1, LPF2, and LPF3. The low pass filter corresponding to a special requirement can be designed according to the special requirement, for example, gradual, so as to uniformize the chrominance of certain pixels in the digital image and to reduce the possibility of the false color of the pixels through the low pass filter.

What is claimed is:

1. A false color suppression method for a digital image, performed on a digital camera, for performing a false color suppression action on a plurality of pixels of a digital image shot by the digital camera, the method comprising:

separating a luminance part and a chrominance part of the digital image;

extracting the chrominance part, and calculating a first color gamut component and a second color gamut component in the chrominance part;

setting a critical value according to a photosensitivity during shooting by the digital camera;

performing a corresponding pixel uniformization action on the pixel, according to a relative relation between a difference between the pixel and a plurality of adjacent neighboring pixels and the critical value respectively for the first color gamut component and the second color gamut component; and combining the uniformized chrominance part and the luminance part of the digital image to a suppressed image;

wherein the pixel uniformization action comprises:

when a difference between the first color gamut component of a certain pixel of the digital image and the first color gamut component of the neighboring pixels is greater than or equal to the critical value, reducing the first color gamut component of the pixel through a low pass filter;

when the difference between the first color gamut component of a certain pixel of the digital image and the first color gamut component of the neighboring pixels is smaller than the critical value, directly acquiring an average value of the first color gamut component of the pixel and the neighboring pixels, and correcting the first color gamut component of the pixel;

when a difference between the second color gamut component of a certain pixel of the digital image and the second color gamut component of the neighboring pixels is greater than or equal to the critical value, reducing the second color gamut component of the pixel through the low pass filter; and when the difference between the second color gamut component of a certain pixel of the digital image and the second color gamut component of the neighboring pixels is smaller than the critical value, directly acquiring an average value of the second color gamut component of the pixel and the neighboring pixels, and correcting the second color gamut component of the pixel.

2. The false color suppression method for a digital image as claimed in claim 1, wherein the digital image is stored in a data sampling format comprising the luminance and the chrominance, and the data sampling format is selected from a group consisting of YUY2, YUYV, YVYU, YUV(YCbCr) 411, YUV(YCbCr)420, YUV(YCbCr)422, and YUV(YCbCr)444.

3. The false color suppression method for a digital image as claimed in claim 1, wherein the first color gamut component is expressed by a formula as follows:

$Cb=0.564*(B-Y)=-0.169*R-0.331*G+0.500*B$;

wherein

Cb is the first color gamut component; and

R, G, and B are color values of the digital image.

4. The false color suppression method for a digital image as claimed in claim 1, wherein the second color gamut component is expressed by a formula in the following:

$Cr=0.713*(R-Y)=0.500*R-0.419*G-0.081*B$; and

Cr is the second color gamut component; and

R, G, and B are color values of the digital image.

5. The false color suppression method for a digital image as claimed in claim 1, further comprising setting times of performing the false color suppression method for the digital image according to the photosensitivity.

6. The false color suppression method for a digital image as claimed in claim 1, wherein the low pass filter is one selected from the following matrix expressions:

$$LPF_1 = \begin{bmatrix} 1 & 2 & 1 \\ 2 & 4 & 2 \\ 1 & 2 & 1 \end{bmatrix};$$

$$LPF_2 = \begin{bmatrix} 0 & 1 & 0 \\ 1 & 4 & 1 \\ 0 & 1 & 0 \end{bmatrix}; \text{and}$$

$$LPF_3 = \begin{bmatrix} 0 & 0 & 0 \\ 0 & 1 & 0 \\ 0 & 0 & 0 \end{bmatrix}.$$

* * * * *